United States Patent [19]

Wamser

[11] Patent Number: 4,648,584
[45] Date of Patent: Mar. 10, 1987

[54] HOODED METALLURGICAL VESSEL

[75] Inventor: Karl Wamser, Moers, Fed. Rep. of Germany

[73] Assignee: Mannesmann Aktiengesellschaft, Dusseldorf, Fed. Rep. of Germany

[21] Appl. No.: 756,602

[22] Filed: Jul. 19, 1985

[30] Foreign Application Priority Data

Jul. 19, 1984 [DE] Fed. Rep. of Germany ....... 3427086

[51] Int. Cl.⁴ ............................................. C21C 5/38
[52] U.S. Cl. ...................................... 266/158; 373/8
[58] Field of Search .................... 266/158, 159; 373/8, 373/9

[56] References Cited

U.S. PATENT DOCUMENTS 4,190,237  2/1980  Baum ................................... 266/158
4,401,464  8/1983  Tivelius .............................. 266/158

Primary Examiner—L. Dewayne Rutledge
Assistant Examiner—Robert L. McDowell
Attorney, Agent, or Firm—Oblon, Fisher, Spivak, McClelland & Maier

[57] ABSTRACT

The invention relates to a metallurgical vessel with a heat shield placed above it and spaced from it by a peripheral air gap. At least one opening is provided in the heat shield through which a probe, lance, or electrode is inserted from the outside into the interior space of the vessel. The heat shield is surrounded by a suction hood placed around the heat shield and opened towards the bottom. The suction hood surrounds the vessel, reaching beneath the peripheral air gap. The air space formed between the heat shield and the suction hood is connected to a suction device. To create a metallurgical vessel of the kind mentioned above which guarantees the effect of suctioning off of the process gases and dust and at the same time provides an effective shield of the ambient air from the molten metal, within the suction hood (1) a partition (3) is placed projecting on the outside from the peripheral gap (2). The partition (3) forms an intake nozzle (8) with the wall (7) of the suction hood (1) which surrounds the vessel (5).

7 Claims, 2 Drawing Figures

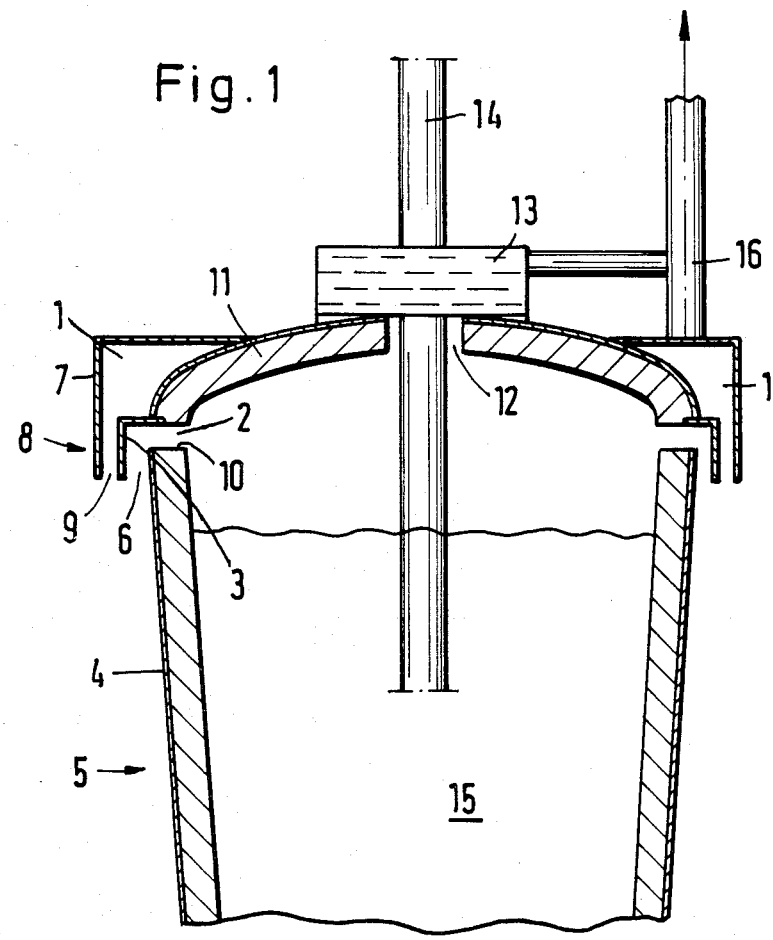

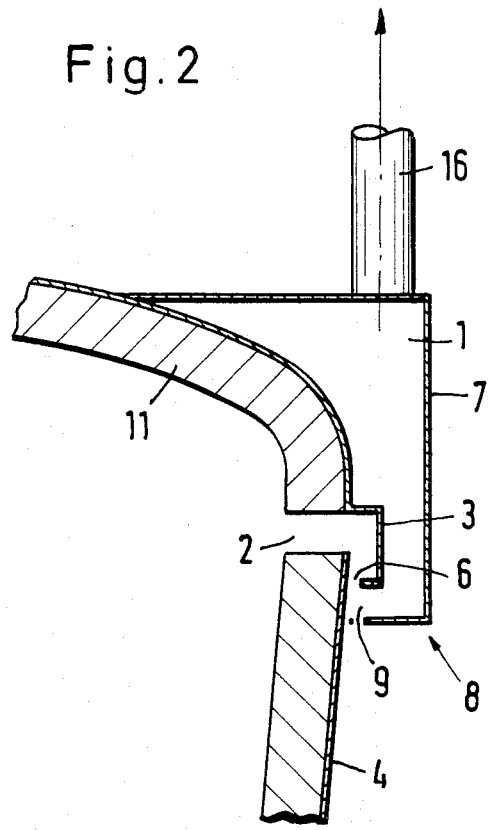

HOODED METALLURGICAL VESSEL

FIELD OF THE INVENTION

This invention relates to a metallurgical vessel for production and/or treatment of molten metals, especially in steel melts.

BACKGROUND OF THE INVENTION

For years it has been common practice to cover metallurgical vessels such as pot furnaces and arc furnaces towards the top for reasons of industrial safety and environmental protection. Additionally, it has been common practice to connect such vessels to a device for suctioning off the gasses and dusts developed during processing. Such a device is known, e.g., from Techn Mitt. Krupp, Volume 18 (1960), No. 3 at page 111 and also from West German published patent document DE-PS No. 28 48 948.

On the other hand, molten metals with especially high degrees of purity are increasingly in demand. This means, e.g., for steel metals adhering to extremely small contents of oxygen and/or nitrogen. Such contents can be achieved only if the steel melt during the pot treatment is shielded from the ambient air as completely as possible (e.g., by use of protective gas or by processing in vacuum). For the production of steels with extremely low oxygen content, a device has been proposed in EPC Patent Application No. 00 92 652 (corresponding to U.S. Pat. No. 4,401,464) which essentially consists of a pot and a suction hood provided with a heat shield. The heat shield covers the pot virtually completely. However, a continuous air gap is left between the rim of the pot and the heat shield. The suction hood extends downwardly beyond the air gap. The outer wall of the suction hood forms a continuous opening with the wall of the vessel through which ambient air can be sucked in by means of a connected suction device. The suction hood and/or the heat shield has one or several openings through which in each case a lance can be inserted into the interior of the pot. The gasses and dusts escaping from the melt during the pot treatment can overflow into the interior of the suction hood between the heat shield and the pot rim through the air gap and are removed with the sucked-in ambient air.

Decisive for the operability of such an installation, aside from adequate dimensioning of the suction device, is especially the size and time constancy of the effective intake cross-section for the process gasses and the ambient air. In this respect the device according to EPC Patent Application No. 00 92 652 (corresponding to U.S. Pat. No. 4,401,464) has the disadvantage that, during operation, skulls may form on the upper rim of the pot, thereby preventing the heat shield from being lowered to the required height above the pot. As a result, the air gap between the pot rim and the heat shield is enlarged, so that the flow rate in the air gap and thus the suction effect is reduced. Since the ambient air that is sucked in also passes through this air gap, it can happen that, e.g., because of an outer air flow running crosswise to the pot, on one side air is pressed in through the air gap into the interior of the pot, while on the opposite side a correspondingly greater amount of gas is suctioned off from the interior of the pot. Thus, despite the use of suction from the pot and the use of protective gas for feeding in the substances required for pot treatment and a certain resulting excess pressure in the interior of the pot, it is not guaranteed that the melt is shielded against oxygen and nitrogen from the air. As a makeshift, to avoid the side effects, customarily doughnut-shaped packing seals filled with refractory materials are placed on the pot rim to achieve sealing.

It is a further disadvantage of this device that, in feeding in the substances for pot treatment, the melt starts bubbling, and gases and dusts escape from the melt which are entrained by the always present strong gas flows (warm air currents) directed upwardly. As a result, despite the pot suction, at least part of the gases and dust press outwardly, especially past the centrally placed lance, through the openings in the heat shield or in the suction hood. The consequence of this uncontrolled thermal flow also is that air flows inwardly against the desired direction of flow through the annular gap between the pot and the lid and there causes a build-up and oxygen contamination of the steel.

OBJECT OF THE INVENTION

Therefore it is the object of the invention to provide a metallurgical vessel of the type initially mentioned which guarantees effective suctioning-off of the process gases and dusts and at the same time provides an effective shielding of the ambient air from the molten metal.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein FIG. 1 shows a partial cross section through a pot with a suction hood.

FIG. 2 shows a partial cross section through a pot with a suction hood and an intake nozzle directed towards the pot.

DETAILED DESCRIPTION OF THE PRESENTLY PREFERRED EMBODIMENTS

As shown in FIG. 1, a pot 5 cooperates with a heat shield 11 which covers the pot 5. A peripheral air gap 2 remains free all around between the heat shield 11 and the upper rim 10 of the pot 5. A suction hood 1 is placed tight fittingly on the outside around the heat shield 11. A continuous partition 3 is tightly connected to the heat shield 11. The continuous partition 3 projects downwardly beyond the peripheral air gap 2 and forms a continuous inner annular gap 6 with the outer wall 4 of the pot 5. The opening of the continuous inner annular gap 6 is lower than the upper rim 10 of the pot 5. The exterior wall 7 of the suction hood 1 forms an external annular gap 9 with the continuous partition 3. The external annular gap 9 is shaped into an annular intake nozzle 8 the opening of which is also lower than the upper rim 10 of the pot 5. The heat shield 11 has an opening 12 through which a lance 14 is inserted from outside into the interior of the pot 5 to treat the melt 15 metallurgically—e.g., to subject it to a scavenging process.

The suction hood 1 is connected by a feed pipe 16 to a suction device (not shown). The opening 12 is sealed off toward the outside by a seal 13 placed around the lance 14. As illustrated, the seal 13 is preferably designed as a labyrinth seal which is also connected to the feed pipe 16.

The device operates as follows:

For example, in a scavenging process with argon, the melt 15 starts to bubble, so that the covering slag blanket is torn apart. To avoid the possibility that oxygen or nitrogen might be absorbed by the melt from the ambient air, low pressure is produced in the suction hood 1 and the seal 13 by means of the feed pipe 16. Process gases and dust, which press from the interior of the pot 5 through the peripheral air gap to the outside, are first directed downwardly through the continuous inner annular gap 6 along the outer wall 4 of the pot 5 and then are sucked upwardly by the annular intake nozzle 8. While the effective cross section of the peripheral air gap 2 can be different for each charge (e.g., due to formation of skulls during use and the lesser lowering of the heat shield 11 required thereby), the cross sectional area of the external annular gap 9 remains the same in each case, so that the same intake conditions always prevail. The opening of the annular intake nozzle 8 can be so dimensioned that high rates of flow, and thus effective suction, can be guaranteed in the fashion of a vacuum cleaner. Thus, considerable advantage arises as compared with the prior art in which inadequate suction can occur on account of the mentioned skull formation. Furthermore, it is assured that external air flows through the pot 5 cannot penetrate into the interior of the pot 5, since they are directly suctioned off by the intake nozzle.

To improve the suction effect of the annular intake nozzle 8 concerning suctioning off of gases and dusts at the expense of sucking up ambient air, it is advantageous to point the opening of the annular intake nozzle 8 toward the outer wall 4 of the pot 5, as shown in FIG. 2.

In the prior art, the air sucked up from the outside in each case passes through the peripheral air gap 2 between the heat shield 11 and the upper rim 10 of the pot 5. Accordingly, if the flow rate is inadequate, there is the danger that the cross flow may penetrate into the interior of the pot 5 and, as a result, that the melt 15 may come into contact with the air. Since in the area above the scavenging spot of the lance 14, a strong warm current occurs (i.e., gas flows are directed upwardly), the danger exists that gases and dust may press toward the outside through the opening 12. However, by means of the labyrinth seal 13, that is safely avoided, since these gases are immediately suctioned off with the dust.

It is also possible to design the suction hood 1 so that the upper part completely encloses the heat shield 11. In this case, the lance 14 passes through an appropriate opening in the suction hood 1. In that configuration, the opening in the suction hood 1 is preferably also sealed off to the outside by an appropriate seal, especially a labyrinth seal.

It goes without saying that several openings 12 from the outside into the interior of the pot 5 may also be provided for feeding in means to treat the melt. Such means do not necessarily have to be lances or probes, but may also consist, e.g., of electrodes, so that the invention can also be applied, e.g., to a metallurgical vessel designed as an arc furnace.

The metallurgical vessel according to the invention avoids the danger present in the prior art of an undesired contact of melt and ambient air. Moreover, it guarantees that the gases and dust arising in the metallurgical process are completely suctioned off even through skulls may have already formed at the upper rim of the metallurgical vessel.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A metallurgical vessel comprising:
   (a) an upwardly open vessel, said upwardly open vessel having an upper rim;
   (b) a downwardly open heat shield having a lower rim, said downwardly open heat shield being sized and shaped so that, in use, its lower rim opposes but is spaced from the upper rim of said upwardly open vessel, leaving a peripheral air gap therebetween;
   (c) a continuous partition having a lower rim, said continuous partition being tightly connected to said heat shield and extending downwardly therefrom to a level lower than the upper rim of said upwardly open vessel, said continuous partition being spaced outwardly from the upper rim of said upwardly open vessel so as to leave a continuous inner annular gap between said upwardly open vessel and said continuous partition;
   (d) a suction hood having a lower rim, said suction hood surrounding said downwardly open heat shield and said continuous partition, the lower rim of said suction hood being outwardly spaced from the lower rim of said continuous partition, leaving a continuous external annular gap between said continuous partition and said suction hood which forms an annual intake nozzle which surrounds said upwardly open vessel and the opening of which is lower than the upper rim of said upwardly open vessel; and
   (e) at least one opening in said downwardly open heat shield through which, in use, a probe can be inserted from the outside into the interior of said upwardly open vessel.

2. A metallurgical vessel as recited in claim 1 wherein said suction hood is tightly connected to said downwardly open heat shield.

3. A metallurgical vessel as recited in claim 2 wherein the opening of said annular intake nozzle is pointed toward the wall of said upwardly open vessel.

4. A metallurgical vessel as recited in claim 1 wherein said suction hood encloses said downwardly open heat shield on the outside only partially, and said at least one opening is tightly sealed against the ambient air.

5. A metallurgical vessel as recited in claim 4 wherein said at least one opening in said heat shield is sealed with a labyrinth seal which, in use, is connected to a suction device.

6. A metallurgical vessel as recited in claim 1 wherein said suction hood completely encloses the upper part of said downwardly open heat shield, at least one opening is formed in said suction hood for the introduction of a probe, and said at least one opening in said downwardly open suction hood is provided with a seal.

7. A metallurgical vessel as recited in claim 6 wherein said at least one opening in said suction hood is sealed with a labyrinth seal which, in use, is connected to a suction device.

* * * * *